Patented May 18, 1948

2,441,671

UNITED STATES PATENT OFFICE 2,441,671

PROCESS FOR PREPARING SULFONAMIDES

Alexander H. Popkin, Bronx, N. Y., assignor to Sun Chemical Corporation, a corporation of Delaware No Drawing. Application March 11, 1944, Serial No. 526,132

5 Claims. (Cl. 260—556)

This invention relates to processes for preparing sulfonamide derivatives of aminoaryl compounds.

It is an object of the present invention to provide processes for preparing aminoarylsulfonamides.

Another object of the present invention is to provide processes for preparing aminoarylsulfonamides from aminoaryl hydrochlorides by chlorsulfonation and subsequent amination.

Another object of the present invention is to provide processes for preparing aminoarylsulfonamides characterized by simplicity and economy of operation and of chemical reaction.

Other objects of the invention will be apparent from the specification and appended claims.

I now have found that aminoarylsulfonamides, compounds of great utility and value in many industrial applications, can be prepared by relatively simple and economical methods — methods which now make readily available such highly valuable and useful materials of great importance. In the practicing of my invention I have discovered that by proper reactions of chlorsulfonation and amination, aminoaryl hydrochlorides can be converted directly into sulfonamide derivatives—thus providing such highly useful materials available for application as such or for further conversion into other useful products.

As illustrative embodiments of successful operations, some examples are hereinafter given representative of practical, useful, commercial operations.

*Example 1.*—In a reaction vessel is placed 650 cc. of chlorsulfonic acid, and there is then added thereto 410 grams of 2-aminobiphenyl hydrochloride under conditions such that predominantly a monosulfonyl chloride compound is formed—and with the above described materials, successful results are secured by adding the hydrochloride over a period of 80 minutes, by maintaining the temperature in the reaction bath below 10° C., as by cooling, and by maintaining the reaction mixture under interreactive agitation, as by stirring, throughout the addition period. When all of the hydrochloride is incorporated, the temperature of the reaction mixture is raised to 60° C., as by heating, and the mixture maintained under interreactive agitation at that temperature over a period of three hours to insure completion of the monosulfonation reaction. The entire mixture is then cooled to room temperature to complete the preparation of 2-aminobiphenyl-4'-sulfonyl chloride.

The sulfonyl chloride reaction product thus obtained is then added to 3200 cc. of concentrated ammonia (26° Bé.) in a reaction vessel, under reaction conditions such that predominantly amination of the sulfonide chloride occurs,—and with the quantities of materials described, successful reaction conditions include maintaining the ammonia-sulfonyl chloride mixture under reaction agitation conditions, as by stirring, and maintaining the reaction temperature between 0° C. and 8° C., as by refrigeration, and by maintaining such agitation for a period of four hours after addition of the sulfonyl chloride is completed. The precipitate which forms is separated from the liquid constituents, as by filtration, and the separated solid material washed with several portions of water until the washings show no trace of chloride or sulfate ion, examination of the washing for these ions being conducted by the well known chemical tests. The washed solid material is then dried, conveniently at 55° C., to furnish 2-aminobiphenyl-4'-sulfonamide in a substantially pure state.

*Example 2.*—To a reaction vessel containing 80 cc. of chlorsulfonic acid is added 50 grams of 4-aminobiphenyl hydrochloride, under conditions such that predominantly a monosulfonyl chloride is formed—and with the quantities described, successful results are obtained by maintaining the reaction mixture under interreactive agitation, as by stirring, throughout the addition period, by maintaining the temperature of the reaction mixture below 10° C., as by refrigeration, and by adding the hydrochloride over a period of 40 minutes. When all of the hydrochloride has been incorporated, the mixture is then heated at 60° C. over a period of three hours, to complete the monosulfonation reaction, and subsequently cooled to approximately room temperature (about 20° C.).

The reaction mixture thus obtained is added to a reaction vessel containing 530 cc. of concentrated ammonia (26° Bé.) under conditions such that amination of the sulfonyl chloride occurs—and with the quantities above described, successful results are obtained by maintaining the reaction mixture between 0° C. and 8° C. throughout the addition period, and by maintaining the admixture under reaction agitation conditions, as by stirring. When all of the sulfonyl chloride has been incorporated, the mixture is maintained under such agitation for an additional period of several hours, to complete the formation of a sulfonamide precipitate. This precipitate is then separated from the reaction admixture, as by filtration, and the solid material thus obtained washed with several portions of hot water until the washings show no trace of chloride or sulfate ion. The washed solid is then dried, conveniently at 95° C., to remove water remaining. In this way there is obtained 4-aminobiphenyl-4'-sulfonamide.

The process of the present invention, examples of which are hereinbefore given, is applicable also to the preparation of arylsulfonamides, in which the starting material is an aryl compound containing a single ring structure, and as illustrative of successful operation, using the monoaryl compounds, the following example is given:

*Example 3.*—o-Toluidine hydrochloride (14.4 grams) is incorporated in a reaction vessel containing 32 cc. of chlorsulfonic acid, under conditions such that a monosulfonyl chloride is formed—and with the quantities above described, successful results are secured by maintaining the admixture under interreactive agitation, as by stirring, throughout the addition period, by maintaining the reaction mixture below 7° C., as by refrigeration, and by incorporating the hydrochloride over a period of twenty-five minutes. To complete the monosulfonation reaction, the admixture is then heated under reaction agitation conditions for two hours at 90° C. and subsequently cooled to room temperature.

The resulting admixture containing sulfonyl chloride is then added to a reaction vessel containing 300 cc. of concentrated ammonia (26° Bé.) under conditions such that amination of the sulfonyl chloride is effected—and with the materials described, such amination occurs when the reaction mixture is maintained under agitation, as by stirring, throughout the addition period, and the temperature of the reaction materials maintained between 0° C. and 11° C., as by refrigeration. The mixture secured is maintained under agitation for an additional period of several hours to complete the formation of a sulfonamide precipitate. The precipitate is then separated from the remainder of materials present, as by filtration, and subsequently washed with several portions of water to remove chloride and sulfate ion. The solid product is then dried at 80° C. to remove the water remaining. The dried product obtained is o-toluidine-p-sulfonamide.

The illustrative examples hereinbefore given, as representative of successful practicing of the present invention, furnish a convenient and relatively simple method for preparing aminoarylsulfonamides. By employing the processes herein described, it becomes possible to prepare such valuable products without the necessity of utilizing cumbersome and expensive and highly complicated procedures heretofore necessary to prepare the highly valuable sulfonamide compounds. For example, it is now unnecessary to use procedures which involve the use of acetic anhydride in the preparation of such compounds, a material which is relatively expensive and which, furthermore, cannot be recovered as such from the reaction product, but which is destroyed in the reaction processes, though it does not appear as a chemical constituent part of the final product, nor is it necessary to employ reaction processes which involve utilization of materials such as phosphorus pentachloride, an expensive material which is difficult to handle and which involves utilization of expensive and relatively inefficient procedures.

While the processes for preparing the products herein described constitute preferred embodiments of the invention, it will be understood that changes may be made therein without departing from the scope of the invention, as defined in the appended claims.

What is claimed is:

1. The process for preparing an aminobiaryl sulfonamide which consists in the steps of chlorsulfonation of an aminobiaryl hydrochloride with chlorsulfonic acid in the ratio of approximately 1 mol of said aminobiaryl hydrochloride to approximately 5 mols of said chlorsulfonic acid and at a temperature below 7° C. to effect formation of a monosulfonyl chloride material in reaction admixture, thereafter aminating said monosulfonyl chloride material with ammonia, whereby a sulfonamide is formed, and thereafter separating and recovering said sulfonamide.

2. The process for preparing an aminoaryl monosulfonamide, which consists in the steps of forming a reaction admixture containing an aminoaryl monosulfonyl chloride by effecting reaction of chlorsulfonic acid with an aminoaryl hydrochloride by addition of said aminoaryl hydrochloride to said chlorsulfonic acid in the ratio of approximately 1 mol of said aminoaryl hydrochloride to approximately 5 mols of said chlorsulfonic acid and at a temperature below 7° C., whereby said aminoaryl monosulfonyl chloride is formed in reaction admixture, thereafter aminating said reaction admixture with ammonia, whereby an aminoaryl monosulfonamide is formed in reaction admixture, and thereafter separating and recovering said aminoaryl monosulfonamide.

3. The process for preparing 2-aminobiphenyl-4'-sulfonamide, which consists in the steps of forming a reaction admixture containing 2-aminobiphenyl-4'-sulfonyl chloride by effecting reaction of chlorsulfonic acid with 2-aminobiphenyl hydrochloride by addition of said 2-aminobiphenyl hydrochloride to chlorsulfonic acid in the ratio of approximately 1 mol of 2-aminobiphenyl hydrochloride to approximately 5 mols of chlorsulfonic acid and at a temperature below 10° C., whereby said 2-aminobiphenyl-4'-sulfonyl chloride is formed in reaction admixture, thereafter aminating said reaction admixture with ammonia, whereby 2-aminobiphenyl-4'-sulfonamide is formed in reaction admixture, and thereafter separating and recovering said 2-aminobiphenyl-4'-sulfonamide.

4. The process for preparing 4-aminobiphenyl-4'-sulfonamide, which consists in the steps of forming a reaction admixture containing 4-aminobiphenyl-4'-sulfonyl chloride by effecting reaction of chlorsulfonic acid with 4-aminobiphenyl hydrochloride by addition of said 4-aminobiphenyl hydrochloride to chlorsulfonic acid in the ratio of 1 mol of 4-biphenyl hydrochloride acid to approximately 5 mols of chlorsulfonic acid and at a temperature below 10° C., whereby said 4-aminobiphenyl-4'-sulfonyl chloride is formed in reaction admixture, thereafter aminating said reaction admixture with ammonia, whereby 4-aminobiphenyl-4'-sulfonamide is formed in reaction admixture, and thereafter separating and recovering said 4-aminobiphenyl-4'-sulfonamide.

5. The process for preparing o-toluidine-p sulfonamide, which consists in the steps of forming a reaction admixture containing o-toluidine-p-sulfonyl chloride by effecting reaction of chlorsulfonic acid with o-toluidine hydrochloride by addition of said o-toluidine hydrochloride to said chlorsulfonic acid in the ratio of approximately 1 mol of o-toluidine hydrochloride to approximately 5 mols of chlorsulfonic acid and at a temperature below 7° C., whereby o-toluidine-p-sulfonyl chloride is formed in reaction admixture, thereafter aminating said reaction admixture with ammonia, whereby o-toluidine-p-sulfonamide is formed in reaction admixture, and thereafter separating and recovering said o-toluidine-p-sulfonamide.

ALEXANDER H. POPKIN.

REFERENCES CITED

The following references are of record in the file of this patent:

UNITED STATES PATENTS

| Number | Name | Date |
|---|---|---|
| 1,911,719 | Schweitzer | May 30, 1933 |

FOREIGN PATENTS

| Number | Country | Date |
|---|---|---|
| 167,377 | Switzerland | May 1, 1934 |

OTHER REFERENCES

Cumming et al., Systematic Organic Chemistry, 1926, page 309.

Chemical Abstracts, vol. 22, (1928), pages 231 and 1972.

Sidgewick's Organic Chemistry of Nitrogen (1937), page 157.

Chemical Abstracts, vol. 35 (1941), pages 5458–5459.

Beilstein, Handbuch der Org. Chemie, vol. XIV, page 686.

Organic Syntheses, Collective, Volume I (1932), pages 8 and 9.